Figure 4:
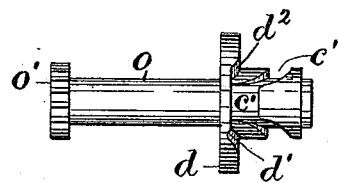

(No Model.) 6 Sheets—Sheet 1.
W. H. BAXTER & W. CROSS.
FEATHERING PROPELLER.
No. 442,791. Patented Dec. 16, 1890.
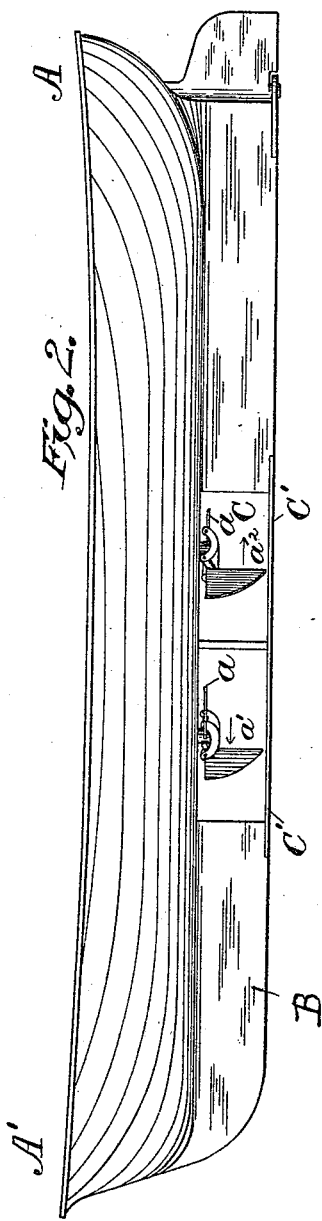
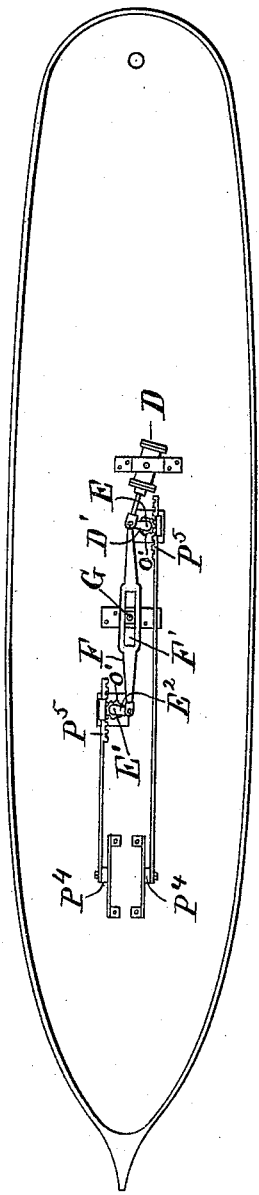
Attest:
L. Lee,
J. Van Hest Jr.
Inventors.
W. H. Baxter and W. Cross,
per Crane & Miller, Attys.

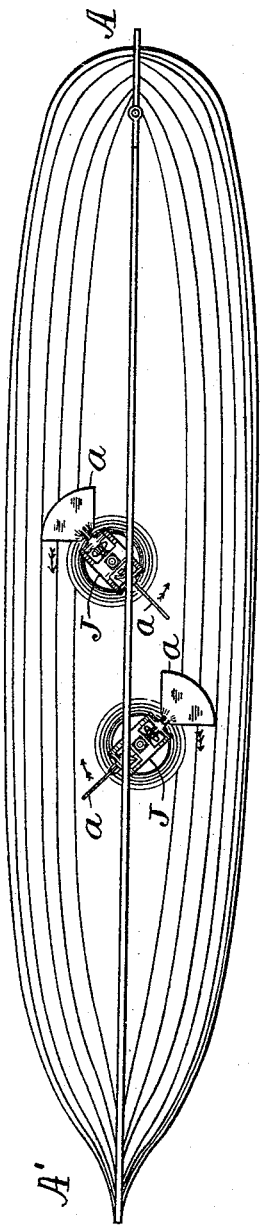

(No Model.) 6 Sheets—Sheet 3.

W. H. BAXTER & W. CROSS.
FEATHERING PROPELLER.

No. 442,791. Patented Dec. 16, 1890.

Attest:
L. Lee.
J. Van Vest Jr.

Inventors.
W. H. Baxter and W. Cross,
per Crane & Miller, Attys.

(No Model.) 6 Sheets—Sheet 5.

W. H. BAXTER & W. CROSS.
FEATHERING PROPELLER.

No. 442,791. Patented Dec. 16. 1890.

Attest:
L. Lee.
J. Van Nest Jr.

Inventors.
W. H. Baxter and W. Cross
per Crane & Miller, Attys.

(No Model.) 6 Sheets—Sheet 6.

W. H. BAXTER & W. CROSS.
FEATHERING PROPELLER.

No. 442,791. Patented Dec. 16, 1890.

Attest:
Frank H. Drummer
J. Van Keel Jr.

Inventors.
W. H. Baxter and W. Cross,
per Crane & Miller, Attys.

UNITED STATES PATENT OFFICE.

WILLIAM H. BAXTER, OF EAST ORANGE, AND WILLIAM CROSS, OF JERSEY CITY, NEW JERSEY; SAID CROSS ASSIGNOR TO SAID BAXTER.

FEATHERING-PROPELLER.

SPECIFICATION forming part of Letters Patent No. 442,791, dated December 16, 1890.

Application filed July 7, 1890. Serial No. 357,972. (No model.)

*To all whom it may concern:*

Be it known that we, WILLIAM HENRY BAXTER, of East Orange, Essex county, New Jersey, and WILLIAM CROSS, of Jersey City, Hudson county, New Jersey, citizens of the United States, have invented certain new and useful Improvements in Feathering-Propellers, fully described and represented in the following specification and the accompanying drawings, forming a part of the same.

The object of this invention is to furnish a means of locating an efficient propeller beneath the bottom of a boat and incidentally to furnish a propeller which is adapted to steer the vessel as well as to drive it forward.

In the present invention the rotary propeller-shaft is vertical and is extended through the bottom of the boat, where two or more blades are movably attached to the shaft and actuated during each rotation of the shaft, so as to alternately present the flat sides and the edges of the blades to the water. The propeller-blades are pivoted each upon a shank provided with a wheel by which it is turned to feather the blades, and a cam is sustained around the propeller-shaft adjacent to such wheels to operate upon the shank as the wheels are carried with the propeller-blades around the cam. The cam is made to rotate for adjusting it at the pleasure of the operator, so as to vary the point of feathering the blade while the propeller is in motion. By this means the operative face of the blade may be presented toward the stern of the boat to propel it directly forward, or toward either side of the boat, so as to turn the boat by pushing one end of it laterally. In practice we use two such propeller-shafts—one abaft the other adjacent to the keel upon opposite sides of the boat—and rotate them in opposite directions, by which we secure a simultaneous action of two propellers upon opposite sides of the boat to drive it straight forward. Two such propellers may, by a suitable adjustment of their respective cams, be made to feather at different points in their rotations, and thus present the operative faces of the blades toward the side of the boat in opposite directions, by which the boat may be turned with greater rapidity than by any form of rudder.

The invention will be understood by reference to the annexed drawings, in which—

Figure 5:
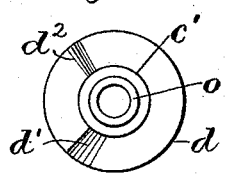
Figure 6:
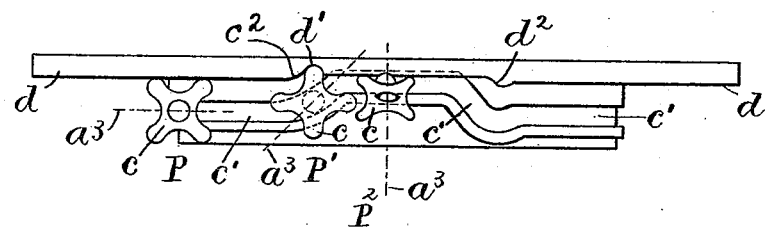
Figure 7:
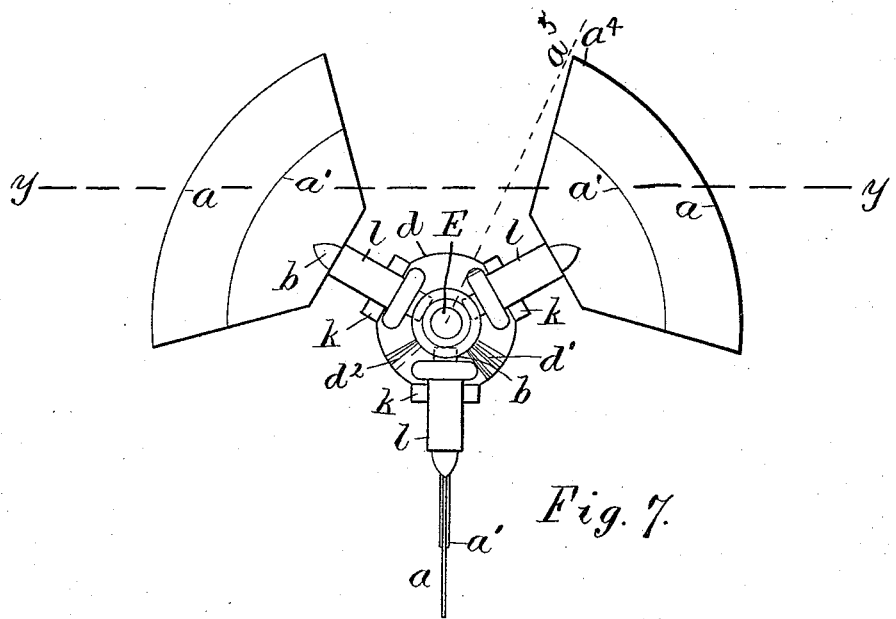
Figure 8:
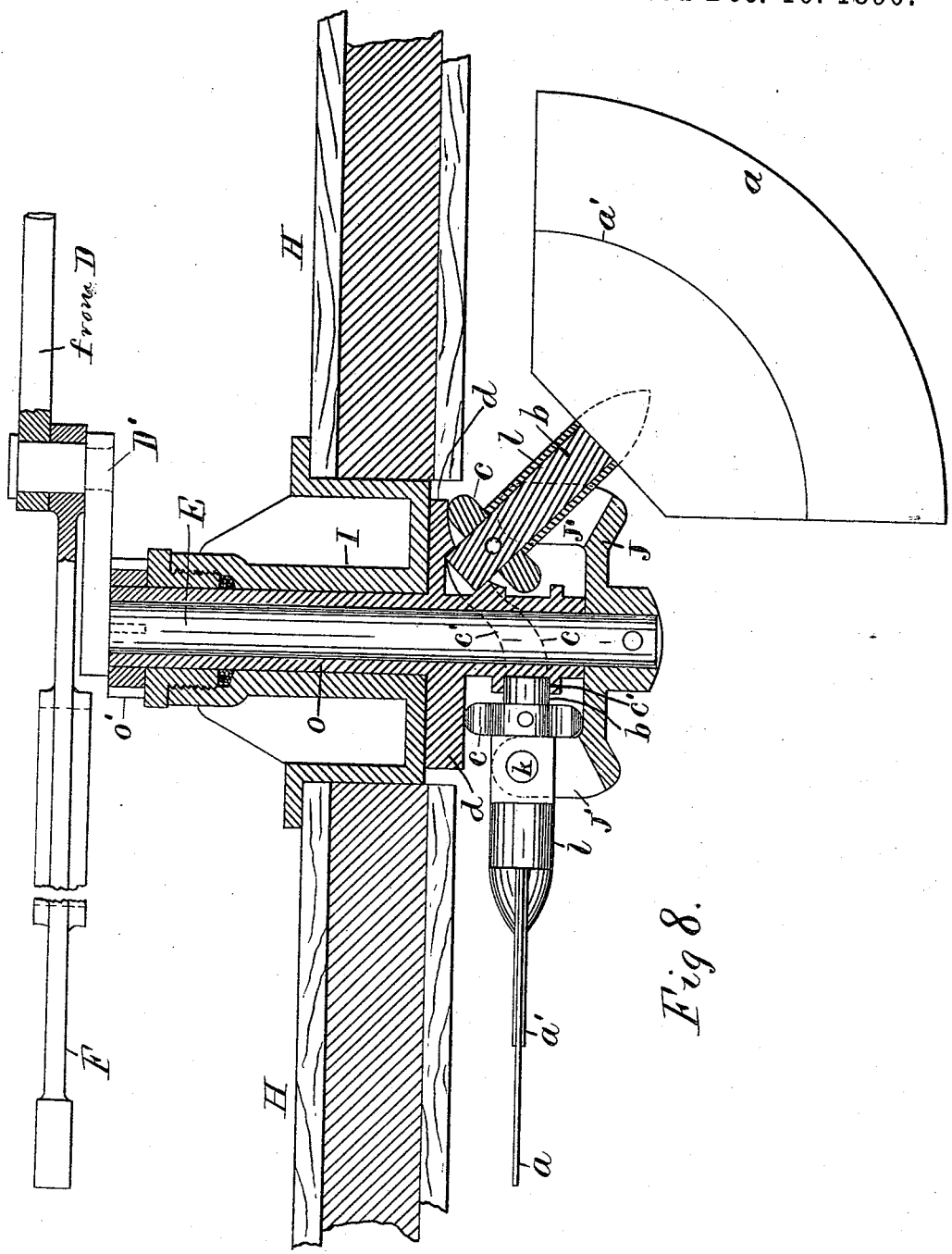
Figure 9:
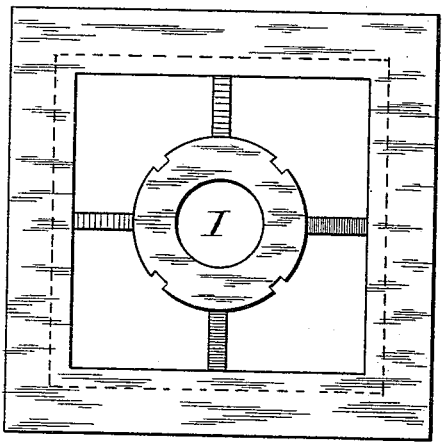
Figure 12:
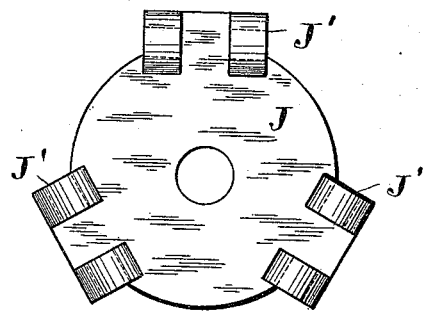
Figure 10:
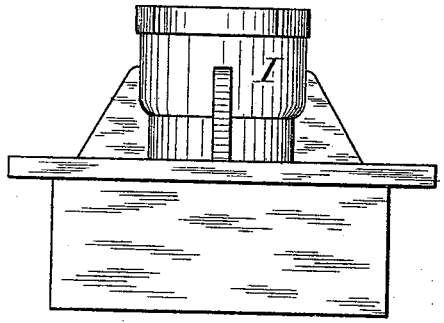
Figure 11:
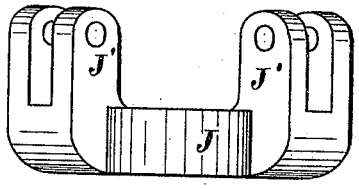
Figure 13:
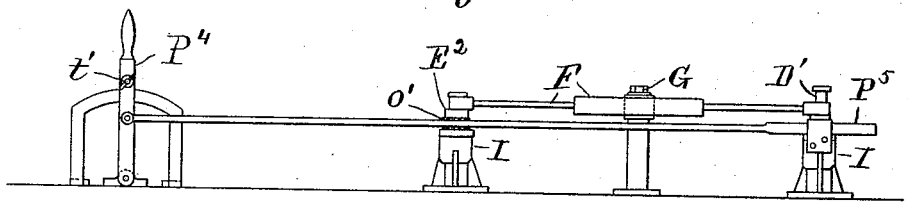

Figure 1 is a plan, and Fig. 2 a side elevation, of a boat provided with these improvements. Fig. 3 represents the bottom of the boat. Fig. 4 is a side elevation of the cam and its turning-sleeve; Fig. 5, a view at the under side of the same. Fig. 6 is a diagram showing a development of the cam-groove, with the guide-wheels shown in different positions in contact with the guide-plate upon the left half of the figure. Fig. 7 is a view of the under side of a three-bladed propeller with its cam and guide-plate. Fig. 8 is a longitudinal vertical section through the bottom of the boat and one of the shaft-bearings, the parts being in section where hatched. Fig. 9 is a plan of one of the shaft-bearings and stuffing-box with the propeller-shaft and cam-sleeve removed. Fig. 10 is a side view of the same; Fig. 11 a side view, and Fig. 12 a plan, of the carriage for mounting three blades upon the propeller-shaft, as shown in Fig. 6. Fig. 13 is a side elevation of the propeller-fixtures above the keel of the boat, and Fig. 14 is a plan of the same.

Figure 14:
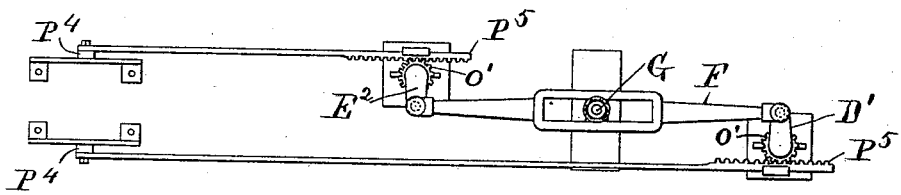

A portion of the fixtures shown in Fig. 14 are omitted in Fig. 1 by reason of the small scale employed.

Figs. 4 to 12, inclusive, are upon a larger scale than Figs. 1, 2, and 3.

In Figs. 1 and 8 two propeller-blades are shown upon the shaft, while Figs. 3, 7, and 11 show a construction to use three such blades.

It is immaterial to the invention what number of blades be used; but we consider three adapted to exert the greatest efficiency.

A' is the bow of the boat, and A the stern; B, a deep keel formed upon the same; C, a cavity cut from such keel and furnished at the bottom with the guard C'.

The propeller-shafts are extended through the bottom of the boat adjacent to such cavity, and the propeller-blades *a* moved partly through the same in their rotations.

In Fig. 2 the feathered blade upon the bow-propeller is shown projected toward the nearer side of the boat, and the acting blade projected toward the farther side of the boat, with the nearer side of the propeller-carriage rotated in the direction of the arrow *a'*.

In the stern-propeller the arrangement of the blades and the motion of the propeller-carriage is reversed, as indicated by the arrow $a^2$.

To indicate the means of driving the propeller-shafts, an oscillating engine D is shown connected with the stern-propeller shaft E; but an electric motor or naphtha-motor or other agent may be employed. The engine D is coupled directly to a crank D' upon the shaft E, and the forward shaft E' is shown connected with the shaft E by means of a crank $E^2$ and a link F. The link is provided at its middle with a longitudinal slot F', fitted to a stationary pin G, which causes one crank to rotate in an opposite direction to the other.

The attachment of the blades to the propeller-shaft is shown in Fig. 8, where the bottom of the boat is shown at H, through which is inserted a shaft-bearing I. The shaft E is provided with a carriage or blade-carrier J, having ears J', furnished with bearings to receive the pivots $k$ of the sockets $l$, in which the shanks $b$ of the propeller-blades are fitted.

The inner end of each shank is furnished with a guide-wheel $c$, having four teeth adapted to engage with a plate $d$, attached to the lower end of a sleeve $o$, through which the propeller-shaft is rotated. The sleeve is held adjustably in the shaft-bearing I by a pinion $o'$, which may be rotated at the pleasure of the operator by a rack $P^5$, attached to a lever $P^4$. Such lever operates as a steering-lever or for reversing the action of the propeller, as will be understood from the subsequent description of the cam.

To illustrate the operation of the propeller-blades, we will describe the same in connection with two propeller-blades, as the operation of each blade in a series is precisely the same whether two or more be used. The blades $a$ (shown in Fig. 7) are formed of a central sheet-metal plate re-enforced where it is attached to the shank $b$ by an additional blade $a'$, secured upon each side of the main blade. By such construction very thin sheet metal may be used, and the blade present a very thin edge to the water when in its feathering position, as shown at the left side of Fig. 2. The shank is turned in the socket $l$ by the guide-wheel $c$; but the socket in which the shank is carried is tipped to throw the blade in its operative position (shown at the right side of Fig. 2) by a groove adapted to embrace the inner end of the shank. A guide plate or disk $d$ is sustained adjacent to the cam to bear simultaneously upon two teeth of the guide-wheels $c$, thus holding the shank from turning when moved into different positions by its contact with the cam $c'$. The groove is annular around a portion of the sleeve to hold the shank horizontal close to the bottom of the boat and the edge of the blade to the water during the feathering-stroke, as at the left side of Fig. 2, and is provided with an abrupt step or curve at one portion of its path to throw the inner end of the shank upward and hold the face of the blade projected below the bottom of the boat during the operative stroke, as shown at the right side of Fig. 2. The form of the groove in the cam $c'$ is projected upon the circular sleeve in Fig. 4; but the successive effects of the cam upon the propeller-blade are shown by the diagram in Fig. 6, where the entire periphery of the cam is projected in a straight line, as if unwrapped from the sleeve, with the edge of the adjacent guide-plate $d$ and the guide-wheel $c$ in contact with the same. The guide-wheel is shown in three positions at the left side of the figure, with a dotted line $a^3$ extended across the wheel to represent the constant relation of the propeller-blade thereto. When the propeller is rotated by the shaft E, the cam and plate $d$ are held in a fixed relation thereto by the pinion $o'$, and the rotation of the carrier J moves the inner ends of the shanks $b$ successively around the sleeve $o$ into all parts of the cam-groove $c'$. The shank is thus moved alternately from the horizontal into the inclined positions shown at the opposite sides of Fig. 2, while the contact of the teeth upon the guide-wheels $c$ with the plate $d$ operates partly to hold the propeller-blades in a certain position and partly to rotate the blade, as is required to effect the feathering. At the position P the cam-groove $c'$ is shown parallel with the guide-plate $d$, with the guide-wheel held from turning with the blade in a horizontal position, as at the left side of Fig. 2. The guide-plate at this point is made sufficiently thick to hold the wheel from turning, while the end of the shank moves in the cam-groove during the entire feathering-stroke.

To turn the blade into the operative position shown at the right side of Fig. 2, the groove $c'$ is bent or curved toward the guide-plate, as shown at $c^2$ in Fig. 6. At the same point a notch or offset $d'$ is formed in the plate $d$, into which a tooth of the wheel $c$ is forced by the lateral pressure of the cam-groove upon the shank, as shown at P' in Fig. 6, producing a rotation of the wheel and gradually turning the propeller-blade around ninety degrees. The inner end of the shank is at the same time pressed upward by the curve $c^2$, so that the blade is dropped in the water, as shown in Fig. 1, with its upper edge close to the bottom of the boat. The shank is attached upon the middle line of the blade, and a mere rotation on such shank would not propel the boat, as the opposite edges of the blade would move in opposite directions against the water; but by the raising of the shank as the blade is turned the rotation produced is practically along the upper edge of the blade upon a line through the center of the shaft E to one corner of the blade lettered $a^4$ in Fig. 7. The whole width of the blade is thus moved the same way and operates effectively in the same direction upon the water.

In Fig. 6 the guide-wheel $c$ is shown at $P^2$, projected obliquely in correspondence with the position shown at the right of Fig. 8, where the cam-groove lies close to the guide-plate $d$ to hold the shank $b$ inclined during the operative stroke of the blade. By the continued rotation of the propeller-shaft the shaft then enters a curve in the cam, which restores it to a horizontal position, the forward tooth of the wheel $c$ striking a shoulder or offset $d^2$ upon the guide-plate $d$, which rotates the wheel and propeller-blade ninety degrees and turns it horizontally to make the feathering-stroke. The shank of each blade is carried in succession into contact with all parts of the cam-groove, so that whatever the number of blades mounted upon the carriage J each is successively turned at the same points in its rotation into the desired position to feather and to make the operative stroke.

In Fig. 7 a dotted line $y\ y$ represents the line of the boat's keel, and the blade at the lower side of the figure is shown in its operative position, while the two other blades upon the carriage are shown in their feathering position, with the tooth $d'$ and shoulder $d^2$ upon the guide-plate at the adjacent sides of the lower blade. It will be remembered that the cam is adjustable by means of the wheel $o'$, and supposing the line of the keel to remain unchanged the rotation of the cam ninety degrees would obviously cause the blade to operate when in line with the keel, instead of at right angles thereto, as in Fig. 7. Such an adjustment of the cam is readily effected by the steering-lever, and such an operation of the blade would obviously press laterally to the keel and serve to steer the boat in a certain direction.

Supposing the two propellers shown in Fig. 2 to have their cams thus adjusted, but in opposite directions, it is obvious that one propeller might operate to push the bow of the boat to the right while the other propeller would operate to push the stern of the boat to the left, and thus turn the boat rapidly in a right-hand curve. Such independent adjustments of the cam are readily effected in any degree by the use of the steering-levers, which may be locked, when adjusted, by a clamp-screw $t'$ (shown in Fig. 13) or by a spring-bolt commonly employed with locomotive-reversing levers.

It will be noticed that the propellers themselves are located below the bottom of the boat, and therefore wholly below the water-line, while the mechanism for actuating them may also be located wholly below the water-line by its arrangement low down inside the bottom of the boat. This style of propeller is thus especially adapted for war-ships, as neither the propeller nor the machinery could be reached by shot. To protect such propellers the keel is preferably extended fore and aft of the same and made of suitable depth to prevent the approach of the propellers to any object beneath the water, the guard $C'$ also serving to keep such objects from contact with the propeller-blades. The propeller may, however, be rotated at any point upon the bottom of the boat beneath the water.

The invention consists, chiefly, in the construction and arrangement of the parts which move the propeller-blade into different positions as it is turned through the water by the propeller-shaft. It is therefore immaterial whether the shaft be mounted in a vertical position, as shown in the drawings, or projected through the bottom of the boat at some other angle.

The two propeller-shafts shown in Fig. 1 are arranged at opposite sides of the keel to avoid intersecting the latter, and thus weakening the frame of the boat; but the shafts may be arranged upon the center line of the boat by properly constructing the frame.

With the construction shown in Fig. 1 the propeller would project outward from the keel when making its operative stroke and would be projected toward the keel when feathering.

A very essential feature of our invention is the compound movement of the blade when presenting its operative face to the water, by which it is rotated practically upon a line from one corner of the blade to the center of the propelling-shaft, as indicated by the dotted lines $a^3$ in Fig. 7. Unless such movement were given to the blade it would be necessary to attach the shank upon a line with one edge, which would very greatly increase the fluid-resistance upon the blade in rotating the same. By attaching the shank at the middle line of the blade the resistance in turning the blade is greatly diminished; but it would, although the entire blade is advancing through the water, neutralize a portion of the propelling-power to have one edge of the blade rotating backward while the other was rotating forward. By gradually inclining the shank of the blade, as the latter is moved in its operative position the blade is practically rotated along the line of its upper edge, while the water-pressure upon the two edges of the blade is entirely balanced and prevents any rotary strain upon the shank.

It is very desirable to prevent an undue projection of the propelling-blades below the bottom of the boat, and such projection is reduced in the greatest degree by pivoting the shanks of the blades close to the bottom of the boat, as shown in Fig. 8, and inclining the shank of each blade as it is thrown into the operative position.

Having thus set forth the nature of the invention, what is claimed herein is—

1. The combination, with a boat, of a propeller-shaft extended through the bottom of the same, means for rotating the same continuously in the same direction, a carriage upon the shaft below the bottom of the boat with two or more bearings for independent rotary shanks at right angles to the shaft, sockets pivoted in such bearings, propeller-blades with shanks rotary in such sockets independent of one another, and a guide-plate attached to the bottom of the boat and operated to turn the shanks in their sockets successively, as and for the purpose set forth.

2. The combination, with a propeller-shaft, of a carriage with bearings for rotary shanks at right angles to the shaft, sockets pivoted in such bearings, two or more propeller-blades with shanks rotary in such sockets, a guide-wheel with four teeth upon the inner end of each shank, and a guide-plate operating with two of such teeth at a time to hold the blade in successive positions at right angles to one another, substantially as herein set forth.

3. The combination, with a propeller-shaft, of a carriage with bearings for rotary shanks at right angles to the shaft, sockets pivoted in such bearings, two or more propeller-blades with shanks rotary in such sockets, a guide-wheel with four teeth upon the inner end of each shank, a cam around the propeller-shaft with groove fitted to the inner ends of the shanks, and a guide-plate operating with two of such teeth at a time to hold the blade in successive positions at right angles to one another, substantially as herein set forth.

4. The combination, with a propeller-shaft, of a carriage with bearings for rotary shanks at right angles to the shaft, sockets pivoted in such bearings, two or more propeller-blades with shanks rotary in such sockets, a guide-wheel with four teeth upon the inner end of each shank, a cam around the propeller-shaft with groove fitted to the inner ends of the shanks, a guide-plate formed with offsets or shoulders to engage the teeth upon the guide-wheels, and curves in the cam-groove to throw such teeth into contact with the offsets, as and for the purpose set forth.

5. The combination, with the bottom of a boat, of a bearing I, a sleeve o, journaled within the same and provided beneath the bottom of the boat with a grooved cam and guide-plate, substantially as described, a propeller-shaft extended through the sleeve and provided beneath the bottom of the boat with a carriage having bearings for rotary shanks at right angles to the shaft, sockets pivoted in such bearings, two or more propeller-blades having shanks rotary in such sockets and with the inner ends of the shanks fitted to the groove in the cam, a guide-wheel upon the inner end of each shank fitted to the guide plate, and means for adjusting the sleeve in different positions, as and for the purpose set forth.

6. The combination, with a propeller-shaft having a carriage with feathering-blades, of a cam and guide-plate mounted upon a sleeve upon such shaft to feather the blades, a pinion upon such sleeve within the boat, and a rack and lever for adjusting the pinion in different positions, as and for the purpose set forth.

7. The combination, with the bottom of a boat, of two upright bearings I, with rotary propeller-shafts projected through the same and rotated in opposite directions, each shaft being provided beneath the bottom of the boat with a carriage having bearings for rotary shanks at right angles to the shaft, sockets pivoted in such bearings, two or more propeller-blades with shanks rotary in such sockets, and means, substantially as described, for feathering the blades at opposite sides of the boat.

8. The combination, with the bottom of a boat, of two upright bearings I, with rotary propeller-shafts projected through the same and rotated in opposite directions, each shaft being provided beneath the bottom of the boat with a carriage having bearings for rotary shanks at right angles to the shaft, sockets pivoted in such bearings, two or more propeller-blades with shanks rotary in such sockets, cams and guide-plates for feathering-blades, as set forth, and means, substantially as described, for adjusting such cams and guide-plates independently to guide the boat in different directions, substantially as herein set forth.

In testimony whereof we have hereunto set our hands in the presence of two subscribing witnesses.

WM. H. BAXTER.
WILLIAM CROSS.

Witnesses:
JNO. D. WALSH,
WM. H. WISE.